W. L. SCHELLENBACH.
LENGTH STOP.
APPLICATION FILED JUNE 14, 1915.
1,171,666.
Patented Feb. 15, 1916.
2 SHEETS—SHEET 2.
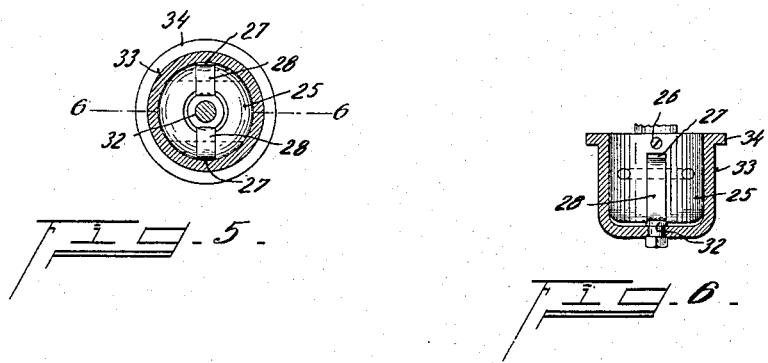
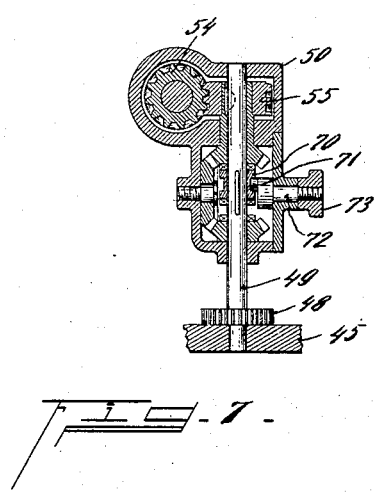
Inventor
William L. Schellenbach
By Wood & Wood
Attorneys

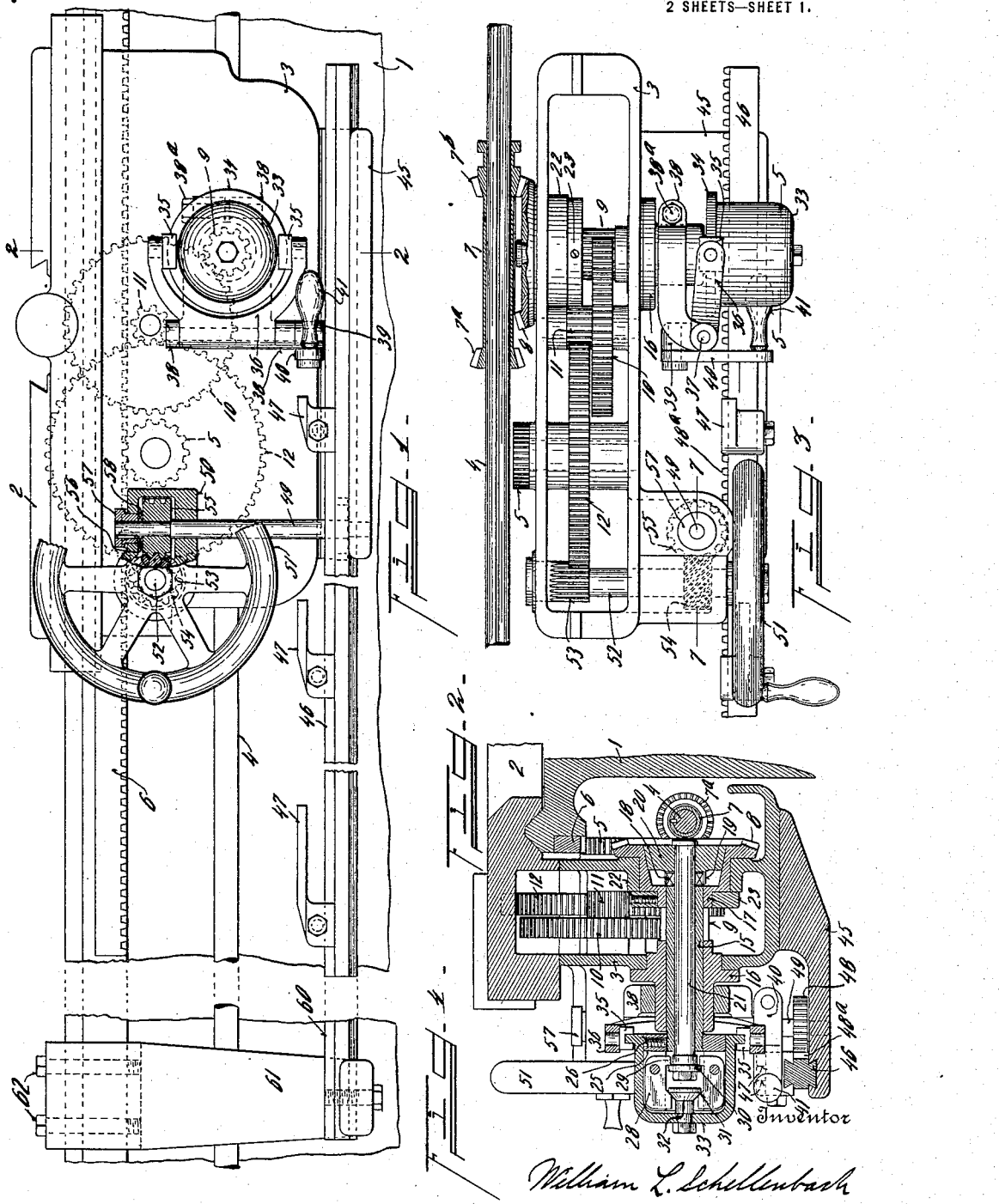

UNITED STATES PATENT OFFICE.

WILLIAM L. SCHELLENBACH, OF HARTWELL, OHIO.

LENGTH-STOP.

1,171,666. Specification of Letters Patent. Patented Feb. 15, 1916.

Application filed June 14, 1915. Serial No. 33,935.

*To all whom it may concern:*

Be it known that I, WILLIAM L. SCHELLENBACH, a citizen of the United States, and residing at Hartwell, in the county of Hamilton and State of Ohio, have invented a new and useful Improvement in Length-Stops, of which the following specification is a full disclosure.

My invention relates to an automatic stop for a feed member of a machine tool, as, for instance, the tool carriage of an engine lathe.

One of the objects of the invention is to provide a feed member with a shiftable stop-engager traveling in unison with the feed member, and a stop member differentially movable on the feed member, and means actuated by the interception of the moving stop and stop-engager member to stop said feed member at a predetermined point, or series of points in the path of travel.

Preferably the feed mechanism coördinately operates the feed member and stop member carried thereon, said mechanism being rendered inoperative when the stop member and its engager coact, and rendered operative when the said engager is shifted out of the path of interception. Also, preferably, this coaction operates a clutch control for the feed shaft, from which the feed member is operated through the usual train of transmission or feed mechanism organized into the feed member structure, as familiarly exemplified by the apron mechanism of an engine lathe.

The tripping mechanism is compact, efficient, precise and all organized as a subcombination component of the feed member or carrier.

The adjustments for sequential tripping can be quickly and conveniently made and with all required precision, and within dimensions determined by the length of the feed member structure, instead of being strung out full length of the bed, as is customary with devices ordinarily used for the same purpose.

The features of the invention, while susceptible of various modifications for adaptation to different types of machine tools, embrace certain distinct principles of invention which can be conveniently disclosed in relation to the apron mechanism of an engine lathe, as shown in the drawings, forming a part of this specification wherein:—

Figure 1 is a front elevation of a portion of the lathe bed and the carriage and apron. Fig. 2 is a vertical section on line 2, 2, Fig. 1. Fig. 3 is a top plan view of the apron. Fig. 4 is a front elevation of a stop bar clamp, as an alternative construction. Fig. 5 is a section on line 5, 5, Fig. 3. Fig. 6 is a section on line 6, 6, Fig. 5. Fig. 7 is a section on line 7, 7, Fig. 3, showing a reverse mechanism for the stop bar drive, as an alternative construction.

The drawings depict a lathe bed 1, having the usual V-ways upon which the tool carriage 2 slides and depending from the front overhanging edge of said carriage is the apron housing 3, supporting the transmission gear train which transmits motion from the lead shaft 4 to the rack pinion 5, meshing with the stationary rack bar 6. The lead shaft 4 is slotted throughout the major portion of its length and has splined thereto the beveled sleeve gear 7 which is adapted to be laterally shifted, by suitable mechanism, to alternately intermesh the teeth $7^a$, $7^b$, with the beveled gear 8 to feed the tool carriage to the right or left, as desired.

The lead shaft is rotated by any suitable driving connections to the rotating elements of the machine, and as such connections are well known, specific illustration thereof is herein omitted.

The gear train includes the reduction gears 9, 10, 11, 12, the gear 12 being secured to the rack pinion shaft.

Intermediate the beveled gear 8 and the gear pinion 9 is a clutch mechanism and operating means therefor, as will now be described. The pinion 9 has an elongated sleeve-like hub 15, which is rotatably journaled in a bushing 16, secured to the front plate of the apron, and in the hub 17 of the beveled gear 8, its inner end being provided with clutch teeth 18, meshing with companion clutch teeth 19, formed on the face of a clutch cone 20. This cone engages in a cone-shaped recess in the face of the beveled gear 8 and is secured to the inner end of a clutch rod 21, slidably mounted within the pinion hub 15, the teeth 18, 19, being of sufficient length to permit a translation of the rod 21 to operate the cone clutch, without destroying the rotative connection between the beveled gear 8 and the pinion hub 15. The gear 8 is rotatably journaled in a bearing 22 in the rear wall of the apron and is retained in position against lateral displacement by a collar 23 secured to the hub 17 thereof. Thus it will be seen that by a lateral translation of the clutch rod 21 outwardly, the cone clutch will function to connect the beveled gear 8 and the pinion 9 as an integral driving unit which will transmit a carriage feeding rotation from the lead shaft 4 to the rack pinion 5 through the intermediate gear train, and, also, that an inward translation of said rod will destroy this driving connection. This mechanism is termed a carriage control, in that its function is to control the operativeness of the carriage traversing means.

To translate the clutch rod 21 and to provide a brake for the gear train, the following mechanism is employed. A sleeve 25 is screw threaded on the outer end of the pinion hub 15 and is secured in set position by a set screw 26; this adjustable connection permitting the taking up of wear in the cone clutch. The sleeve 25 is provided with diametrically opposed slots 27, in which are pivotally mounted two clutch operating dogs 28, one end 29 of which engages behind a collar 30 fixed to the clutch rod 21, and the other end having angled edges 31, adapted to be engaged with a cam-like action by a cone stud 32. Said cone stud is fixed to and projects inwardly from a translatory shell 33, slidably mounted on the sleeve 25. The outward translation of the shell causes the cone stud to rock the dogs 28 about their pivots, thereby shifting the clutch rod 21 to function the cone clutch of the beveled gear 8. The shell 33 has a peripheral tongue 34 on its outer surface which is engaged by grooved shoe blocks 35, pivoted in the forked ends of a clutch operating clevis 36. Said clevis is fixed to a vertical pivot stud 37 journaled in a split bracket 38, secured by a bolt 38ª to the bushing 16. The stud 37 extends downwardly and has fixed to its lower end an arm 39, to which is pivoted an abutment lever 40, having a hand grip 41. When pressure is exerted on the lever 40, as indicated by the arrow in Fig. 3, said lever, the arm 39 and the clevis 36 are rocked as a unit, translating the shell 33 inwardly to disengage the cone clutch of the beveled gear 8.

The translation of the shell inwardly is limited by the outer face of the sleeve 25, which forms a rigid stop for the clutch operating mechanism. When this stopping point has been reached, any additional pressure on the lever 40 will cause the notched shoe blocks 35 to frictionally bind against the tongue 34, to form an effective brake to immediately arrest the momentum of the gear train.

The apron is provided with a forwardly extending shelf bracket 45 in which is slidably dove-tailed a stop bar 46, having a dove-tailed upper surface to which is clamped a series of selectively positioned stop dogs 47, which are of the well-known telescoping type. The inner edge of the stop bar 46 is provided with rack teeth 48ª, meshing with a pinion 48, secured to a vertical shaft 49, which at its lower end is journaled in the bracket 45 and at its upper end in a gear housing 50 projecting from the apron. The apron hand wheel 51 is secured to the shaft 52, said shaft terminating with a pinion 53, which is in mesh with the gear 12 of the gear train. A worm pinion 54 is fixed to the hand wheel shaft and meshes with a companion worm pinion 55, loosely journaled on the shaft 49 and having clutch teeth 56 on its upper surface. A clutch collar 57 is splined to the upper end of the shaft 49 and is provided with clutch teeth 58, adapted to mesh with the clutch teeth of the worm pinion, to form a driving connection between the hand wheel shaft 52 and the shaft 49. This driving connection may be disengaged when desired by manually raising the clutch collar 57. Thus it will be seen that as the carriage travels to the left, the stop bar 46 is translated toward the abutment lever 40 to successively engage its stop dogs 47 therewith, to disengage the beveled gear clutch, as previously described. This arrangement, wherein the stop bar is translated relative to the apron, permits the use of a comparatively short stop bar and also provides a device which is self-contained within and upon the apron. As an alternative construction to be used when turning exceptionally long pieces of work, I substitute a long stop bar 60 of approximately the length of extreme carriage travel, for the above described short stop bar and secure said long bar in the lower end of a bracket 61, see Fig. 4, which extends upwardly and embraces the V-way of the lathe bed. Said bracket is detachably clamped to the bed by screws 62, thereby providing a stationary stop bar. When this long stationary bar is used, the clutch collar 57 is disengaged from the worm pinion 55, thereby disconnecting the stop bar driving gear train. If it is desired to use this long stop bar in the same manner, as previously explained in connection with the short stop bar, i. e. translating it toward the abutment lever, the screws 62 may be loosened and the bracket 61 allowed to travel on the V-ways of the bed.

In certain classes of work it is desirable to feed the tool carriage to the right during a tooling operation and to provide a translation of the stop bar 46 toward the abutment lever 40 during a carriage travel in either direction, I provide a reverse drive mechanism for said bar, as shown in Fig. 7. This alternative or modified structure consists of an ordinary jack-in-the-box gear unit intermediate the worm pinion 55, and shaft 49 is provided with a clutch sleeve 70, having a neutral and two gear engaging positions, said clutch sleeve being translated by a pin or roller 71, mounted eccentrically on the stud 72, which extends external of the jack-in-the-box casing and terminates with an operating knob 73.

Having described my invention, I claim:—

1. In a device of the class described, a bed, a carriage slidable thereon, means for traversing the carriage on the bed, a clutch and clutch-actuator on the carriage for connecting or disconnecting said traversing means, a member supported by and movable on the carriage, having devices for engaging and automatically operating said clutch-actuator, and means for moving said member relative to said carriage taking motion from said carriage traversing means.

2. In a device of the class described, a bed, a carriage slidable thereon, means for traversing the carriage on the bed, a clutch and clutch-actuator on the carriage for connecting or disconnecting said traversing means, a member supported by and movable on the carriage, having devices for engaging and automatically operating said clutch-actuator, means for moving said member relative to said carriage taking motion from said carriage traversing means, and means for moving said clutch-actuator into and out of the path of travel of said devices on the sliding member.

3. In a device of the class described, a bed, a carriage slidable on the bed, means for traversing the carriage on the bed, a clutch and clutch-actuator on the carriage for connecting or disconnecting said traversing means, a member supported by and movable on the carriage having devices for engaging and automatically operating said clutch-actuator, and means taking motion from said traversing means for moving said member on the carriage in a direction reverse to that in which the carriage is traveling.

4. In a device of the class described, a machine bed, a carriage and apron slidable thereon, means on the apron for traversing said carriage in either direction on the bed, a clutch mechanism on the apron controlling said traversing means, a member supported by and movable relative to the apron, and mechanism operated by said traversing means for sliding said member relative to the apron, whereby its devices engage the clutch-actuator at predetermined times in the traverse of the carriage.

5. In a device of the class described, a machine bed, a carriage and apron slidable thereon, means on the apron for traversing said carriage in either direction on the bed, a clutch mechanism on the apron controlling said traversing means, a member supported by and slidable relative to the apron, mechanism operated by said traversing means for sliding said member relative to the apron, whereby its devices engage the clutch actuator at predetermined times in the traverse of the carriage, means for fixing said member to the bed, and means for disconnecting the drive of said member relative to the carriage traversing means.

6. In a device of the class described, a bed, carriage and carriage control, a stop member on the carriage for engaging said control, and means rendered operative by said control for moving the carriage on the bed, and the stop member on the carriage at differential speeds.

7. In a device of the class described, a bed, a sliding carriage, traversing means, a control for said traversing means, a stop member supported by and movable on the carriage, and having devices for engaging and actuating the control, said traversing means also operating said stop member, and means for bringing said member to a dead stop after the tripping operation.

8. In combination with a lathe bed, a carriage, a multiple stop member supported by and movable on the carriage, means for moving the carriage relative to the bed and the stop member relative to the carriage, and a control for said means actuated by the member for stopping the carriage feed.

9. In a device of the class described, a bed, carriage and stop-engager on the carriage, a stop member on the carriage for coacting with said stop-engager, and means rendered operative by said stop engager for coördinately moving the stop member relative to the carriage and the carriage relative to the bed and rendered inoperative when said stop and stop engager contact.

10. In a device of the class described, a bed, a carriage and a stop engager on the carriage, a stop member movable on the carriage and arranged for selective coaction with the stop engager, mechanism for coördinately operating said carriage relative to the bed, and stop member relative to the carriage, and means rendering said mechanism inoperative when the stop member and stop engager contact.

11. In a device of the class described, a bed, carriage, a shiftable stop engager on the carriage, a movable coacting stop member on the carriage, mechanism for differentially operating said carriage and stop member, and a control for said mechanism rendering said mechanism inoperative when the stop member and stop engager coact, and rendering said mechanism operative when the stop engager is moved out of contact with the stop member.

12. In a device of the class described, a carriage, a shiftable stop engager and a traveling stop member, both mounted on the carriage, mechanism for unitarily moving the carriage and stop engager and for differentially moving the stop member on the carriage in a path of travel to be intercepted by the stop engager when the carriage is in selective position for tripping, and means rendering said mechanism inoperative when said stop member and stop engager coact.

13. In a device of the class described, a carriage, a stop-engager on and movable with the carriage, a stop member differentially movable on said carriage, and means actuated when the moving stop member and the moving stop-engager intercept on the carriage to render said carriage inoperative.

14. In a device of the class described, a carriage, a stop-engager on and movable with the carriage, a stop member differentially movable on said carriage, means actuated when the moving stop member and the moving stop-engager intercept on the carriage to render said feed member inoperative, and means for selectively determining different points for said interception in relation to the path of travel of said carriage.

In witness whereof, I hereunto subscribe my name, as attested by the two subscribing witnesses.

WILLIAM L. SCHELLENBACH.

Witnesses:
 EMMA STENER,
 L. A. BECK.

Copies of this patent may be obtained for five cents each, by addressing the "Commissioner of Patents, Washington, D. C."